July 14, 1953 L. R. McROBERT 2,645,072
POSITION CONTROL APPARATUS FOR BEET HARVESTERS
Original Filed April 19, 1946
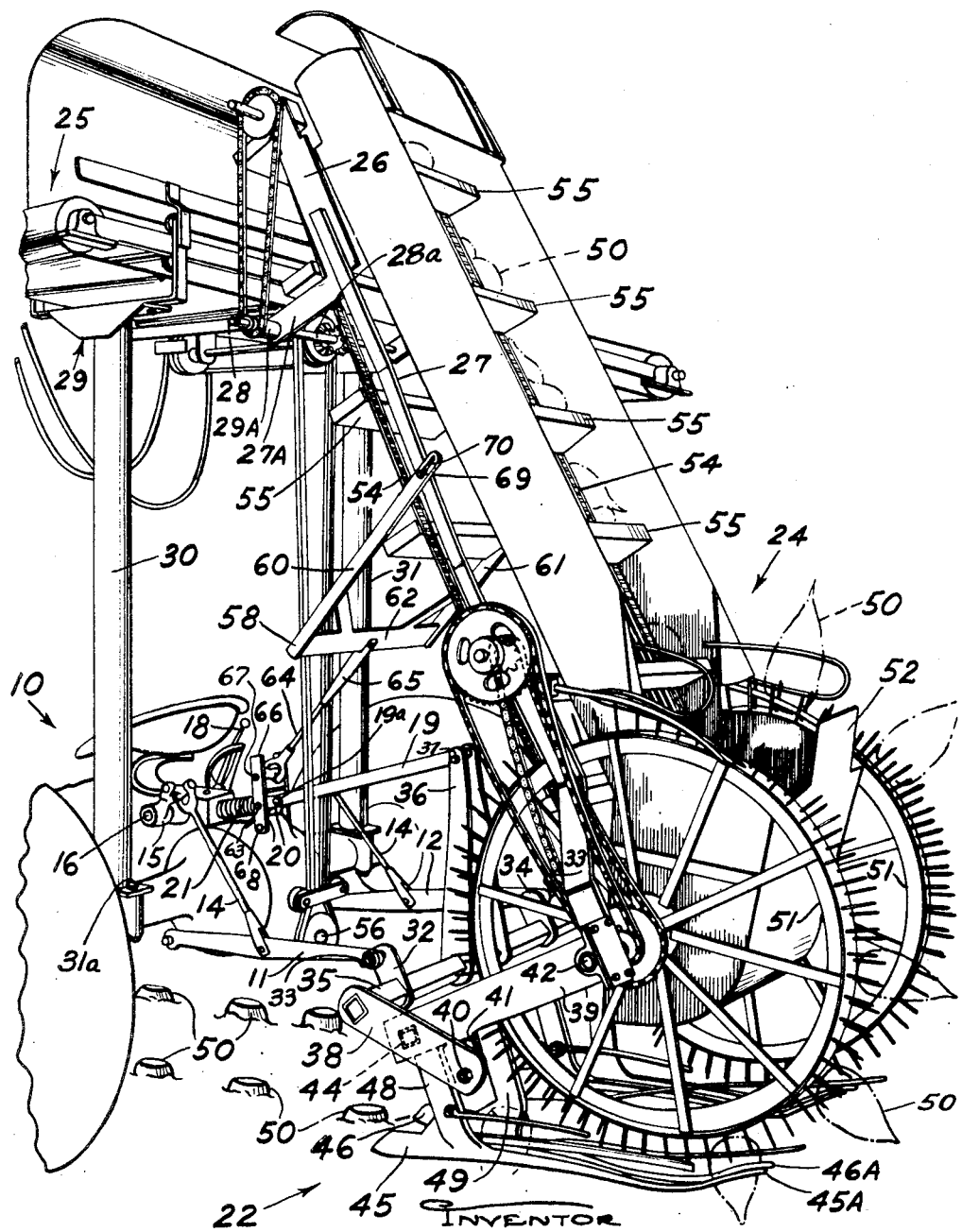
INVENTOR
LEON R. McROBERT
Carlson, Pitzner, Hubbard & Wolfe
ATTORNEYS Patented July 14, 1953

2,645,072

UNITED STATES PATENT OFFICE 2,645,072

POSITION CONTROL APPARATUS FOR BEET HARVESTERS

Leon R. McRobert, Greeley, Colo., assignor to Harry Ferguson, Inc., Detroit, Mich., a corporation of Delaware Application April 22, 1947, Serial No. 743,186

5 Claims. (Cl. 55—106)

The present invention relates to means for positioning an agricultural implement with respect to the earth and more particularly to a device for use with a tractor power lift for maintaining digger plows in a predetermined digging position.

It is an object of the present invention to produce an improved position control arrangement for use with earth engaging agricultural implements exerting a relatively small amount of draft force. It is a more detailed object of the invention to produce a beet digger which employs a power lift device to limit digger plows and to maintain them at a predetermined position substantially independently of the force of draft.

It is another object of the invention to provide an implement control system which utilizes the weight of an auxiliary implement such as an elevator to actuate a power lift device for maintaining the implement at a predetermined level.

Further objects and advantages of the invention will become apparent as the following description proceeds, taken in connection with the accompanying drawing which is a perspective view of a tractor drawn beet digger and elevator embodying the present invention.

While the invention is susceptible of various modifications and alternate constructions, I have shown in the drawing and will describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Prior to discussion of the implement position control embodying the invention, it will be helpful to refer briefly to the well known Ferguson system as used in a lightweight agricultural tractor, designated in the drawing generally at 10 and of which only the rear portion is shown. The tractor hitch includes a lower pair of laterally spaced draft links 11, 12 pivoted at their forward ends beneath and forward of the tractor rear axle. These links are suspended by drop links 14 from cranks 15 mounted at the opposite ends of a rockshaft 16. The latter is oscillated by an internal hydraulic ram (not shown). With regard to operation, it will suffice to say that pressure fluid may be admitted to and exhausted from the ram under the control of a main control valve (not shown) operable by a quadrant lever 18 to raise and lower the links 11, 12. Moreover, compression on a third or top link 19 which normally engages a pivotal connection 19a on a rocker arm or shackle 20 serves to rock the latter forwardly against the bias of a control spring 21 to effect an exhaust of fluid from the ram. With a plow or other implement producing a large draft force connected to the links 11, 12 and 19, for example as shown in Henry George Ferguson Patent No. 2,118,180 issued May 24, 1938, the action is such as to retain automatically a constant draft load.

Keeping the above structure in mind, reference may be made to the drawing which discloses a light draft type of implement having a novel and effective control arrangement which is not only adapted for connection to the links of the Ferguson system but which is controllably coupled to the hydraulic lift portion thereof. In the present instance, the invention has been applied to a combined beet digger and elevator having a digging portion 22 and an elevating portion 24. If desired, a transverse conveyor 25 may also be included for laterally transporting the material discharged from the elevator.

The device is adapted to dig beets in two rows simultaneously and includes two duplicate sets of digger apparatus for accomplishing this function. Because of such duplication and because of the resulting symmetry of the hitch arrangement and linkage about a vertical plane passing through the center of the implement, only one perspective view of the digger is necessary to understand both the structure and operation. The elevator main frame, indicated generally at 26 and which also aids in supporting the digger portion 22, includes longitudinal side members 27 which extend forwardly and upwardly between a pivot support 28 near the top and supporting linkage associated with the draft links 11, 12 at the bottom.

Referring more particularly to the pivot support 28 near the top of the elevator, it will be noted that it consists of a transverse shaft 28a which is journaled in supporting arms 27a on frame members 27 and in appropriate brackets 29a of an elevated framework 29. This elevated framework is, in turn, supported on a pair of columns 30, 31 rigidly and detachably mounted on the rear axle housing of the tractor 10 by bolts 31a. The pivotal mounting of the elevator enables the elevator framework 26 to be swung with a limited pendulum-like movement about the shaft 28a toward and away from the tractor.

At the lower end, the implement is supported on the trailing ends of the draft links 11, 12. The latter are detachably connected to tabs 32, 34 for pivotal engagement therewith by pivot pins 33 carried by the tabs. The tabs 32, 34 in turn, are rigid with and extend upwardly from a main horizontal cross bar 35. In order to resist the torsional forces about the bar 35, and to stabilize the same with respect to the tractor, a vertical arm 36 is provided which projects upwardly from the bar 35 and which carries a pivot pin 37 at its upper end portion for detachable pivoting engagement with the upper link 19. At the ends of the bar 35 and welded or otherwise fixed thereto are brackets 38 which extend rearwardly. Each of the latter serves to support a plow supporting arm 39 by a pivoted connection 40, the latter being located on a tab 41 which projects downwardly from the mid portion of the arm. At the trailing ends of the arms 39 a journaled connection is made with a transverse lower shaft 42 which, in turn, supports longitudinal frame members 27 of the elevator frame 26.

The plow supporting arms 39 at their forward extremities carry a second cross bar 44 rigidly between them. This cross bar serves as a means for mounting the ground engaging members of the implement, in the present instance plow blades 45, 46. The latter are arranged in cooperating pairs, being suspended from the cross bar 44 by vertical supporting arms 48, 49, respectively. The plow blades 45, 46 during normal operation are lowered into the ground by the lowering of the tractor draft links 11, 12 and, upon forward movement of the tractor, engage a beet such as that shown at 50 and which has previously been topped in place by any desired means. Since the plow blades 45, 46 taken together define a narrowing V-shaped notch, the engaged beet is gradually pried out of the ground passing along trailing fingers 45a, 46a respectively associated with the plow blades.

As the beets pass rearwardly, they are impaled on associated conveyor wheels 51, are carried about the latter approximately one-half revolution, and are pried off into a hopper 52, whence they are removed by the elevator portion 24 of the device. To effect removal endless conveyor chains 54 are used having cleats 55 mounted thereon at spaced intervals. Both the conveyor chains 54 and the conveyor wheels 51 may be driven by a tractor power take-off 56 or by any desired means. The conveyor wheels 51, the specific means here used for elevating the beets, and the driving means for the latter per se, form no part of the present invention and reference is made to the Reynolds and McRobert application, Serial No. 663,512, filed April 19, 1946, for a more detailed discussion.

Upon observing the drawing in greater detail, it will be seen that the visible rearwardly extending bracket 38 and the associated plow supporting arm 39 form a jointed linkage in which the bracket and arm comprise relatively jackknifing sections. The bracket 38 extends rearwardly at substantially the same angle over a considerable range of elevation due to the parallelogram mounting of the same on the tractor, the parallelogram including the lower linkage 11, 12, the upper link 19, and the arm 36. Accordingly, the pivot 40 at the trailing end of the bracket 38 undergoes substantially vertical movement as the links 11 and 12 are raised. As an incident to such movement, the plow supporting arm 39 is caused to swing upwardly about its pivot 42 into an extended, more nearly horizontal position, the latter causing the elevator framework 26 to swing rearwardly about its upper pivoting axis 28. Stated another way, the bracket 38 and the arm 39, mutually pivoted at 40, form a toggle linkage which is straightened upon the raising of the draft links, forcing its outer end, attached to the elevator frame 26, outwardly. The amount of arcuate movement of the elevator frame 26 is quite small as compared to the vertical movement of the draft links and plows due to the mechanical advantage inherent in the toggle linkage.

Because of the very light draft load involved in the use of the digger plows 45, 46, particularly under loose soil conditions, it is not feasible to control their depth of penetration by the conventional Ferguson system arrangement in which the hydraulic lift on the tractor is caused to raise and lower the implement automatically to retain the draft load substantially constant. In other words, the draft loads involved may be too small to operate the spring 21 for any reasonable size of the latter. To overcome that difficulty and in accordance with the present invention, an actuating arrangement has here been provided in which the weight of a movable portion of the implement is utilized for correctively controlling the hydraulic power lift mechanism in the tractor to maintain the implement at a desired level. In brief, the arrangement is such that lowering of the digger and elevator causes the elevator to swing inwardly and a portion of the weight thereof to be applied through a leverage system to arbitrarily load the control spring 21, resulting in movement of the control spring 20 in a direction to restore the digger plows to their original level. Thus the lowermost limit of the unit of the plows in the soil may be adjustably set.

As to the particular arrangement illustrated for applying force to the control spring 21, it will be seen from the drawing that a force transmitting or thrust member indicated generally at 58 and having a lost motion connection, for example, a pin and slot connection, is used between the elevator framework 26 and the shackle 20 associated with the control spring 21. Preferably, the member 58 is in the form of a yoke having rearwardly projecting arms 60, 61 and a crosspiece 62 extending between them. Mounted centrally of the cross member 62 and extending downwardly into the region of the shackle 20 is a control rod 64 having a threadedly telescoping portion 65. In order to increase the force available for compressing the spring 21 at the shackle 20, a force multiplying arrangement is used. In the present instance multiplication is accomplished by connecting the rod 64 to the shackle 20 by means of an extension lever consisting of two opposed plates or side extensions 66. The latter are mounted at one of their respective ends, say at their lower ends as viewed in the accompanying drawing, on the tractor rear end housing by means of a pivot connection 68 which coincides with the axis of pivoting of the shackle 20. The members 66 are fastened to the shackle 20 by a pin 63 and to the implement by a pin 67 so that the structure forms a lever of the second class for applying compressive force to the control spring.

At the upper ends of the arms 60, 61, lost motion is provided by a pin and slot arrangement, a pin 69 attached to each of the longitudinal members 27 bottoming in a corresponding slot 70. This enables the elevator to be swung upwardly and rearwardly through a considerable angle as required for transport without corresponding movement of the hydraulic control element on the tractor.

With the lost motion taken up, it is important to observe that a definite positional relationship exists between the positioning of the control shackle 20 and the level of the plows. Such relationship can be shown by noting the effect of lowering the lower links 11, 12. The latter causes lowering of the transverse bar 35 which, in turn, lowers the pivots 40 and the digger plows 45, 46. Since the rear pivot support 42 of the plow supporting arm 39 remains at very nearly the same level, it will be apparent that lowering of the pivot point 40 near the forward end thereof will cause relative jack-knifing of the bracket 38 and the arm 39. Such jack-knifing results in forward swinging of elevator frame 26 toward the tractor and the application of additional compressive force on the control spring 21. The resulting compression of the control spring 21 and movement of the shackle 20 is effective to return the main control valve of the system to the neutral or control point, thus discontinuing further exhaust of fluid from the main ram. As disclosed in the Ferguson patent referred to, the latter prevents further lowering of the draft links 11 and 12 and thus prevents the plow blades 45, 46 from digging more deeply into the earth. The plow elevation at which the hydraulic control comes into operation to prevent further lowering of the plows may be adjusted by changing the length of the member 58 merely by causing increased or decreased threaded engagement of the telescoping portion 65 thereof.

Since inward swinging of the elevator frame occurs simultaneously with the lowering of the lower links, and since the control connection 58 may be adjusted to determine the position at which the elevator frame will bear on the yoke to thrust it inwardly and stop further lowering of the lower links, a lower limit position control results which may be set for any desired position of the elevator frame. Thus, with the connection 58 adjusted to a desired length, the hydraulic control system is forced to constantly seek out a position of equilibrium in which the plow blades 45, 46 and the elevator frame 26 are neither so low as to cause excessive compression of the control spring 21 (and thus cause admission of additional fluid to the ram) nor so high as to cause a release of pressure on the spring 21 and consequent exhaust of fluid from the ram.

As an additional feature it is to be noted that the characteristics of the Ferguson system using the control arrangement shown are such as to enable a limited amount of manual control, on the order of an inch of plow movement, by using the quadrant lever 18. This results from the fact that the extent of "downward" movement of the quadrant lever, to start the inward swinging movement of the elevator frame, determines the extent of inward movement of the yoke required to stop lowering. Thus, any change in the position of the quadrant lever will produce a corresponding limited change in the position of the implement.

While the invention has been described in connection with a combined elevator and digger, it will be apparent that my invention is not limited to the use of this specific combination. If desired, for example, the elevator function may be eliminated, the primary requirement being that the implement supporting frame (here longitudinal members 27) or other auxiliary members connected to the implement apply weight to the hydraulic control element 20 in unison with the raising and lowering movements of the draft links. Since considerable force is required for compression of the spring 21, it is, of course, desirable that the weight of the implement pressing downwardly on the same through the force transmitting member 58 be appreciable. Such force may be increased if desired, either by artificially adding weight to the implement or by increasing the effective length of the lever arms 66. It will be apparent to one skilled in the art that excessive lengthening of the arms 66 is undesirable since it requires that the member 58 move through a greater displacement to produce a given control effect. The system as a whole would then be less sensitive in regulating the positioning of the draft links and therefore the depth of penetration of the plow blades. Proportioning the elements approximately as shown, however, has been found to work out quite satisfactorily in practice.

This application is a division of Reynolds and McRobert application Serial No. 663,512 filed April 19, 1946.

I claim as my invention:

1. In an attachment for a tractor having a pair of laterally spaced pivoted links trailing from its rear end portion together with a power actuated lift device for swinging said links upwardly and a movable spring returned control element therefor, movement of said control element from an equilibrium position in the spring-compressing direction being effective to initiate raising of said links: the combination comprising an implement, means for detachably connecting said implement to said links for raising and lowering thereby, said implement including an auxiliary member, means for detachably supporting said auxiliary member on said tractor for movement upwardly and downwardly in unison with the movement of said draft links, a control linkage interconnecting said auxiliary member and said tractor control element, and force multiplying means interposed in said control linkage to enable the weight of said auxiliary member to displace said tractor control element to its equilibrium position thereby to maintain said implement at a level corresponding to said equilibrium position.

2. In an attachment for a tractor having a pair of laterally spaced pivoted links trailing from its rear end portion together with a power lift device for swinging said links upward and a spring biased control element for causing said device to raise or lower in response to changes in the stress applied to said spring, the combination comprising: a tool bar, means for detachably connecting said tool bar to said links in position to extend transversely therebetween, an implement frame, means mounted on said tractor for pivotally supporting said frame at its upper end in an elevated position with respect to the tractor, said frame extending rearwardly and downwardly from its point of support, an additional implement component supported by said tool bar at a level determined by the level of said tool bar, means interconnecting said tool bar and said frame for concurrent raising and lowering thereof, a force transmitting member engaging said frame for applying at least a portion of the weight thereof to said control element against the force of said spring bias, downward movement of said additional component below a predetermined level being effective to cause application of increased force on said force transmitting member thereby to effect upward movement of said power lift device to said predetermined level.

3. For use with a tractor having a power elevated draft link extending rearwardly therefrom and having a spring biased control element together with a shackle having one of its ends pivoted on the tractor and having provision at its other end for connection with a compression link to which thrust is normally applied by an implement for the purpose of causing inward movement of the control element and elevation of the draft link, the combination comprising: an implement adapted for connection to the draft link, an extension lever rigidly mounted at one of its ends on said shackle to pivot therewith or urging the shackle about its point of pivoting on the tractor and having its opposite end positioned outwardly of the shackle, and a thrust member having its rear end connected to the implement and its forward end connected to said opposite end of said extension lever for facilitating inward movement of the control element in response to thrust from the implement.

4. In an implement control system for a tractor having a power elevated draft link extending rearwardly therefrom and having a spring biased control element together with a shackle having one end pivoted to the tractor and having its other end connected to a compression link to which thrust is normally applied by an implement for the purpose of causing inward movement of the control element and raising of the draft link, the subcombination comprising: an extension lever for said shackle, said extension lever having two plates arranged parallel to one another adjacent opposite sides of the shackle, said plates having means at their lower ends respectively in alinement for pivoting to the tractor about the axis of pivoting of the shackle, said extension lever further having means thereon for fastening the same to the shackle for movement therewith, and fastening means at the remote end of the extension lever for connection thereto of a thrust member from an implement and thereby to facilitate inward compressing movement of the control element.

5. In an implement control system for a tractor having a power elevated draft link extending rearwardly therefrom and having a spring biased control element effective to initiate raising of the draft link when thrust inwardly against the bias of the spring of said control element, said tractor also having a horizontal pivot connection adjacent said control element, the subcombination comprising: a force multiplying attachment having means at its lower end for pivoting to the tractor about the horizontal pivot connecion on the tractor, means on the intermediate portion of the attachment for engaging the control element and applying compressive force to the associated spring of said control element, said attachment further having an elongated lever portion having pivot means at the upper end thereof for connection of a thrust member from an implement to facilitate inward compressing movement of the control element by the implement, the last mentioned pivot means being spaced substantially farther from said pivot connection on the tractor than said means for engaging the control element to provide a substantial mechanical advantage.

LEON R. McROBERT.

References Cited in the file of this patent

UNITED STATES PATENTS

| Number | Name | Date |
| --- | --- | --- |
| 2,223,002 | Ferguson | Nov. 26, 1940 |
| 2,336,623 | Loucks et al. | Dec. 14, 1943 |
| 2,347,091 | Elliott | Apr. 18, 1944 |
| 2,405,980 | Sands et al. | Aug. 20, 1946 |
| 2,414,114 | Martin | Jan. 14, 1947 |
| 2,460,847 | Schwarz | Feb. 8, 1949 |

FOREIGN PATENTS

| Number | Country | Date |
| --- | --- | --- |
| 595,740 | Great Britain | Dec. 15, 1947 |